United States Patent [19]
Lee

[11] Patent Number: 5,515,466
[45] Date of Patent: *May 7, 1996

[54] ONE-PIECE SC FIBER OPTIC CONNECTOR AND METHOD OF TERMINATING OPTICAL FIBER USING SAME

[75] Inventor: Hsin Lee, Issaquah, Wash.

[73] Assignee: Augat Inc., Mansfield, Mass.

[*] Notice: The term of this patent shall not extend beyond the expiration date of Pat. No. 5,428,703.

[21] Appl. No.: 370,870

[22] Filed: Jan. 10, 1995

Related U.S. Application Data

[63] Continuation of Ser. No. 198,532, Feb. 18, 1994, Pat. No. 5,428,703.

[51] Int. Cl.⁶ .................................................... G02B 6/36
[52] U.S. Cl. .................................... 385/78; 385/60; 385/86; 385/76; 385/77; 385/139
[58] Field of Search .................................... 385/53, 55, 56, 385/60, 66, 68, 69, 76, 77, 78, 80, 84, 86, 139

[56] References Cited

U.S. PATENT DOCUMENTS

| | | | |
|---|---|---|---|
| 4,279,467 | 7/1981 | Borsuk et al. | 350/96.21 |
| 4,279,469 | 7/1981 | Forman | 350/96.22 |
| 4,461,537 | 7/1984 | Raymer, II et al. | 350/96.2 |
| 4,595,251 | 6/1986 | Moulin | 339/47 R |
| 4,696,537 | 9/1987 | Bauer et al. | 350/96.2 |
| 4,717,344 | 1/1988 | Schempp et al. | 439/61 |
| 4,767,179 | 8/1988 | Sampson et al. | 350/96.2 |
| 4,840,451 | 6/1989 | Sampson et al. | 350/96.2 |
| 4,934,785 | 6/1990 | Mathis et al. | 359/96.21 |
| 4,944,568 | 7/1990 | Danbach et al. | 359/96.2 |
| 5,054,879 | 10/1991 | Brown | 385/59 |
| 5,091,990 | 2/1992 | Leung et al. | 385/81 |
| 5,101,463 | 3/1992 | Cubukciyan et al. | 385/72 |
| 5,104,242 | 4/1992 | Ishikawa | 385/53 |
| 5,121,455 | 6/1992 | Palecek | 385/60 |
| 5,125,854 | 6/1992 | Bassler et al. | 439/607 |
| 5,127,073 | 6/1992 | Mulholland et al. | 385/92 |
| 5,134,677 | 7/1992 | Leung et al. | 385/84 |
| 5,142,599 | 8/1992 | Sakurai et al. | 385/78 |
| 5,179,607 | 1/1993 | Sellers et al. | 385/70 |
| 5,179,608 | 1/1993 | Ziebol et al. | 385/69 |
| 5,181,267 | 1/1993 | Gerace et al. | 385/86 |
| 5,193,133 | 3/1993 | Schofield et al. | 385/85 |
| 5,208,887 | 5/1993 | Grinderslev | 385/81 |
| 5,212,752 | 5/1993 | Stephenson et al. | 385/78 |
| 5,214,752 | 5/1993 | Beard et al. | 385/78 |
| 5,215,473 | 6/1993 | Brunker et al. | 439/108 |
| 5,216,733 | 6/1993 | Nagase et al. | 385/60 |
| 5,245,683 | 9/1993 | Belenkiy et al. | 385/72 |
| 5,265,183 | 11/1993 | Feng et al. | 385/78 |
| 5,276,752 | 1/1994 | Gugelmeyer et al. | 385/69 |
| 5,311,609 | 5/1994 | Abe | 385/60 |
| 5,321,784 | 6/1994 | Cubukciyan et al. | 385/78 |
| 5,428,703 | 6/1995 | Lee | 385/78 |

*Primary Examiner*—Brian Healy
*Attorney, Agent, or Firm*—Weingarten, Schurgin, Gagnebin & Hayes

[57] ABSTRACT

An SC connector includes a back body having a locking member and a front body having a locking member and a buffer back post. The front body is disposed in the back body and the back body locking member and front body locking member engage to provide a one-piece ferrule buffer back post connector assembly.

23 Claims, 5 Drawing Sheets

ONE-PIECE SC FIBER OPTIC CONNECTOR AND METHOD OF TERMINATING OPTICAL FIBER USING SAME

RELATED APPLICATION

This application is a continuation of application Ser. No. 08/198,532, filed Feb. 18, 1994, entitled: ONE-PIECE SC FIBER OPTIC CONNECTOR, now U.S. Pat. No. 5,428,703.

FIELD OF THE INVENTION

This invention relates to connectors and more particularly to fiber optic connectors.

BACKGROUND OF THE INVENTION

As is known in the art, one type of fiber optic connector is a so-called "SC" connector. Conventional SC connectors include a number of separate components which require assembly during to properly terminate a fiber optic cable. Typically such connectors utilize a double-ended receptacle, a plug which includes on one end a buffer back post and on a second end a ferrule holder, which holds a ferrule and a spring which is disposed about the buffer back post and between the plug and receptacle. Thus, typical SC connectors require the manipulation of a number of separate disconnected components during the assembly process.

During the assembly process, the receptacle is placed over one end of the fiber optic cable, as is the spring. An optical fiber is then inserted through the buffer back post and into the ferrule. The optical fiber is forced through the ferrule until a buffer portion of the fiber optic cable is disposed in the buffer back post of the plug. Once the fiber optic buffer is disposed in the buffer back post, the spring and the receptacle are disposed over the plug.

The fiber optic cable is attached to the ferrule using epoxy. A syringe is used to inject the epoxy into the buffer back post prior to inserting the optical fiber and buffer into the back post. When the epoxy is injected into the buffer back post, some epoxy typically overflows out of the buffer back post. If epoxy overflows it may glue the spring to the buffer back-post. Since conventional SC connectors are unable to be disassembled for cleaning, the connector must then be thrown away because it is necessary to keep the spring free floating with respect to the buffer back post to properly terminate the fiber optic cable.

It would thus be desirable to provide an SC connector which may be pre-assembled prior to connection of a fiber optic cable and which may be disassembled for cleaning in the event epoxy overflows during the assembly process. It would also be desirable to provide an SC connector which does not require the manipulation of a number of disconnected connector components during the assembly process.

SUMMARY OF THE INVENTION

In accordance with the present invention, a fiber optic connector includes a back body having a first opening and a second opening and a bore extending between the first and second openings. The back body further includes a locking member coupled to the first end of the back body and a first shoulder region extending into the bore of the back body at a first predetermined distance from the first opening. The connector further includes a front body having a first end having an aperture therein and a second end. The front body further includes a back post projecting from the second end of the back body and a locking member coupled to the front body wherein the second end of the front body is disposed in the bore of the back body and the front and back bodies are secured together by the front body locking member and back body locking member.

With this particular arrangement, an SC connector which enables an assembler to connect all of the necessary parts so that they are handled as one piece is provided. Moreover an SC connector which may be disassembled to clean excess epoxy is provided. If the back body and spring are not removed from the buffer back post, excess epoxy cannot be properly cleaned because the areas of epoxy overflow cannot be accessed. Thus, the present invention allows the connector to be disassembled to allow access to those areas which are desirable to clean and remove excess epoxy. Furthermore, with SC connector of the present invention, the process of mating the connector with an optical fiber can be accomplished more rapidly and with less chance of damaging or weakening the optical fiber due to applied stresses during the termination process because a single component is handled rather than a number of different components.

BRIEF DESCRIPTION OF THE DRAWINGS

The foregoing features of this invention as well as the invention itself may be more fully understood from the following detailed description of the drawings in which.

DESCRIPTION OF THE PREFERRED EMBODIMENTS

Figure 1:
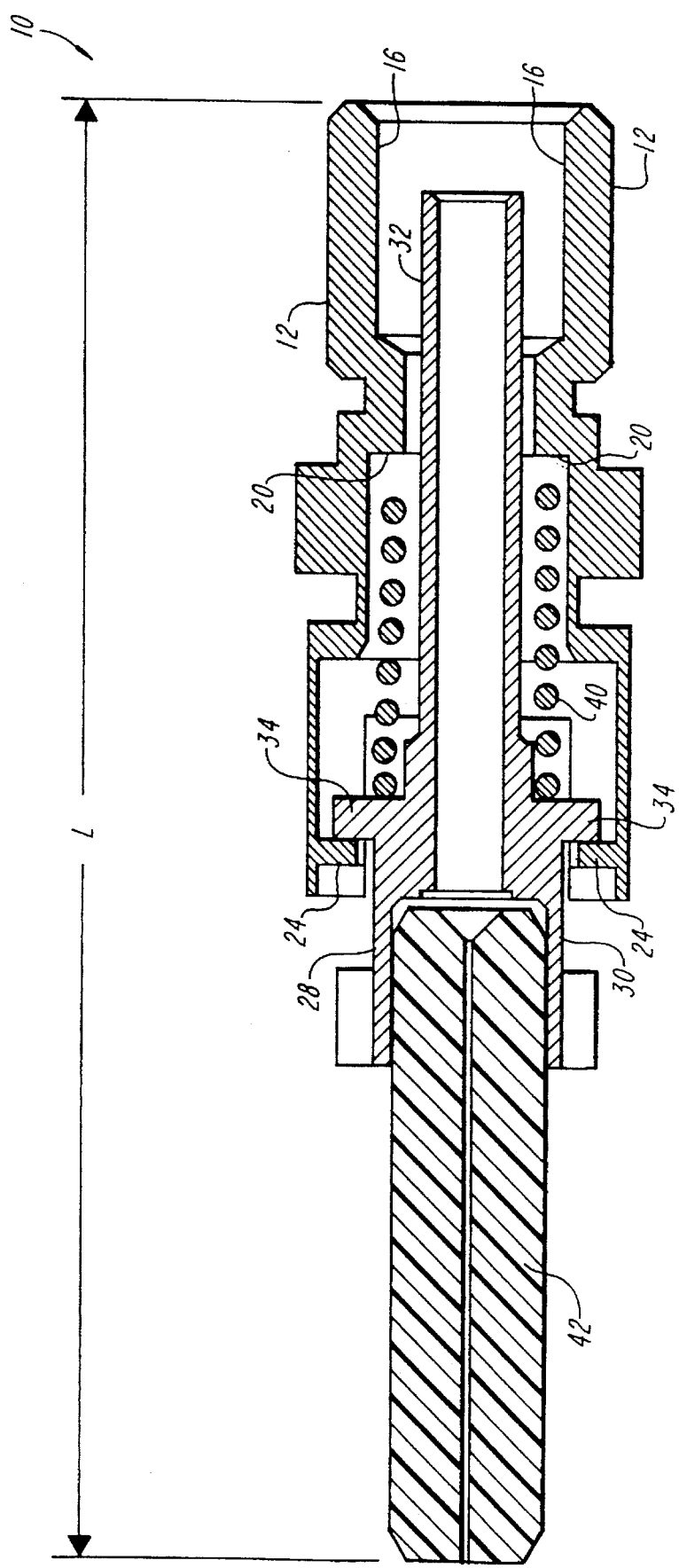
FIG. 1 is a cross sectional view of a fiber optic connector.
Figure 1A:
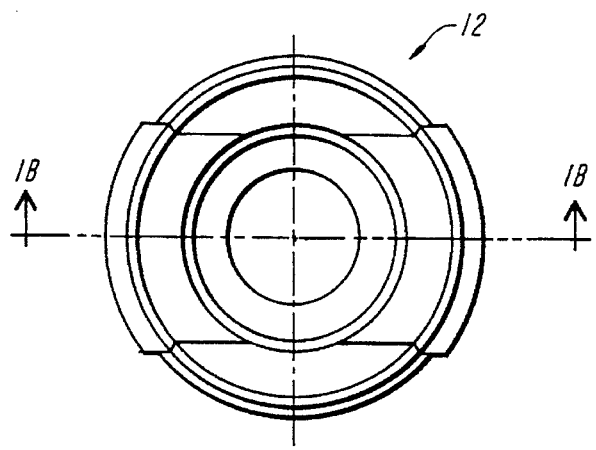
FIG. 1A is a front view of a back body.
Figure 1B:
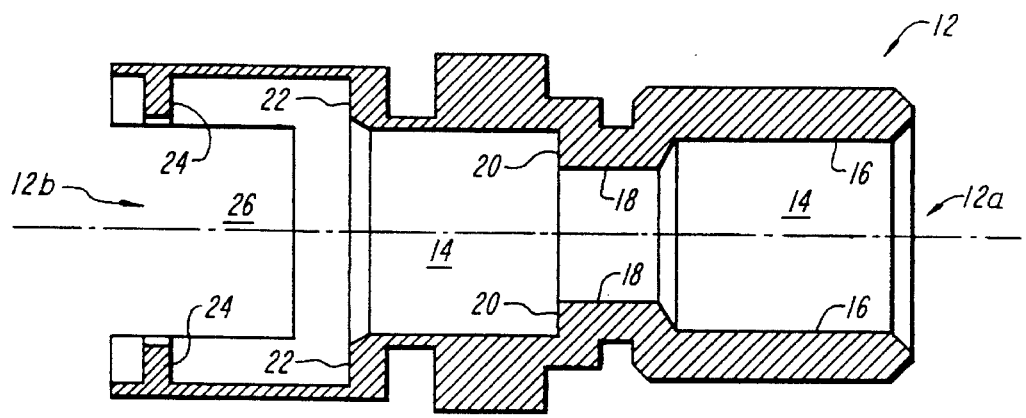
FIG. 1B is a back body cross sectional view taken along lines 1B—1B of FIG. 1A.
Figure 1D:
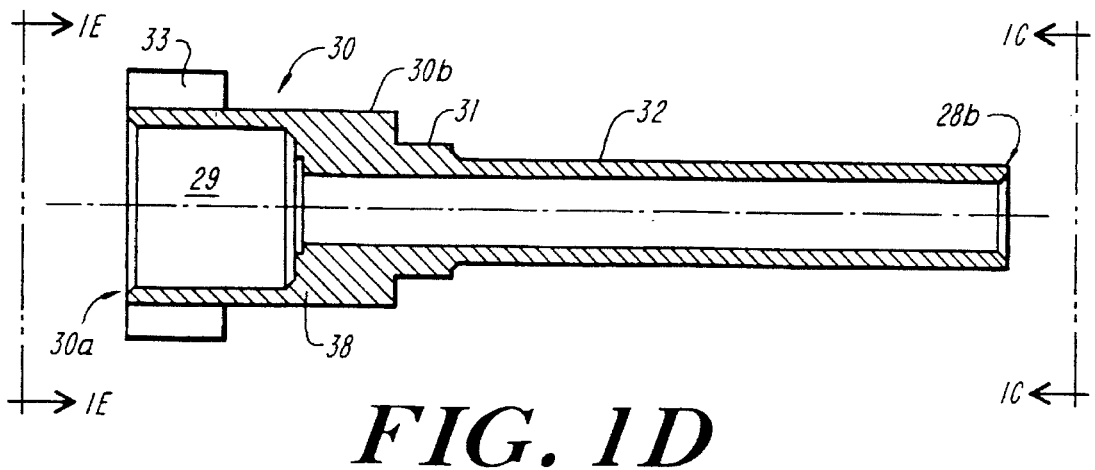
FIG. 1D is a cross-sectional view taken along lines 1D—1D of FIG. 1C.
Figure 1E:
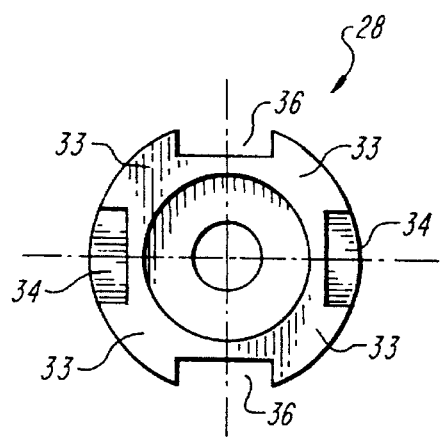
FIG. 1E is an end view of the front body shown in FIG. 1D.
Figure 1C:
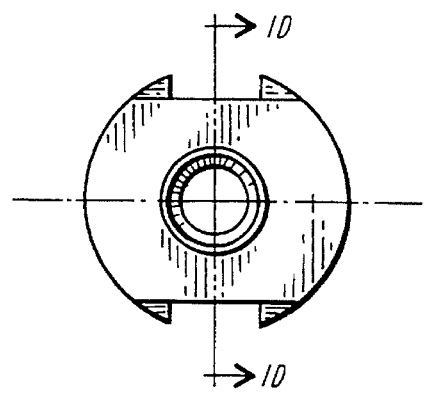
FIG. 1C is a end view of a front body.
Figure 1F:
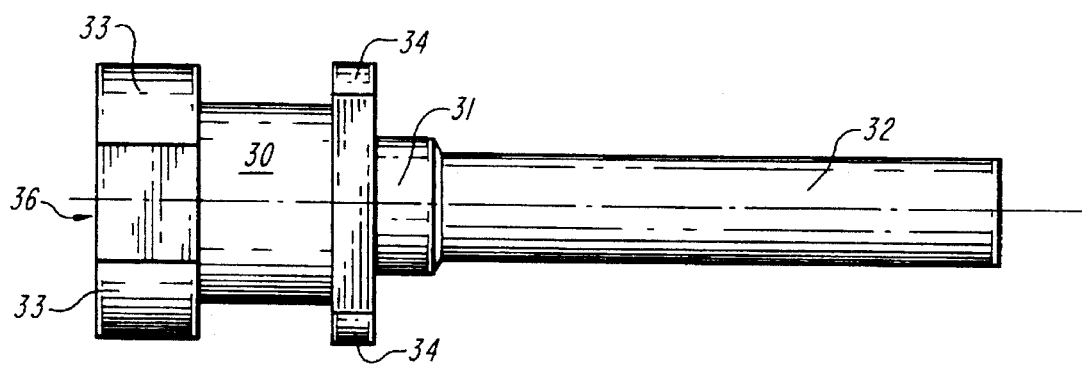
FIG. 1F is a side view of the front body shown in FIGS. 1C–1D.

Referring now to FIGS. 1–1F, a ferrule buffer back post connector assembly 10 having a length L typically of about 23.45 millimeters (mm) includes a back body 12 having a front body 28 disposed therein.

As may be more clearly seen in FIGS. 1A and 1B, back body 12 includes first and second openings 12a, 12b and a bore 14 extending between first and second openings 12a, 12b. An inner surface 16 of back body 12 includes a neck down region 18 having a diameter typically of about 2.1 mm. Neck down region 18 forms a first shoulder region 20. Back body 12 further includes a second shoulder region 22 and a locking member 24 extending from back body inner surface 16 into an open region 26 of back body 12.

As may be more clearly seen in FIGS. 1C–1F front body 28 includes a base portion 30 having a first end 30a having a cavity 31 therein and a second end 30b. A back post 32 having a diameter typically of about 1.64 mm projects from second end 30b of back body base 30. Front body 28 includes a step region 31 disposed on the second end of base 30. A flange 33, here provided as a ring shaped member having slots 36 therein, projects from an outer surface 38 of front body 28. A locking member 34, here provided as a substantially rectangular shaped member having rounded ends, projects from an outer surface 38 of front body 28.

Although back body 12 and front body 28 are here shown as an integral piece, it should be appreciated that back and front bodies 12, 28 may be manufactured from one or more pieces and assembled together to provide back and front bodies 12, 28 as single pieces. The particular number of pieces from which front and back bodies 12, 28 are manufactured may be selected to provide a low cost high quality ferrule buffer back post assembly 10.

As shown in FIG. 1, a portion of front body 28 is disposed in bore 14 of back body 12 and front body locking member 34 and back body locking member 24 secure together back and front bodies 12, 28.

A spring 40, having a outside diameter typically of about 3.05 mm and a thickness typically of about 0.51 mm is coupled to front body 28 via an interference fit with step region 31 of buffer back post 32. That is, the diameter of step 31 is selected to provide an interference fit with spring 40. Step 31 thus engages spring 40 and holds spring 40 such that spring 40 surrounds buffer back post 32.

By coupling spring 40 to front body 28 in this manner, spring 40 and buffer back post 32 are concentrically aligned and spaced apart by a distance typically of about 0.20 mm. A ferrule 42 is disposed in cavity 29 of front body 28 to thus couple ferrule 42 to buffer back post 12 through front body 28.

Connector 10 is assembled in the following manner. Ferrule 42 is inserted into cavity 29 of front body 28. Spring 40 is disposed over buffer back post 32 and engaged on step region 31 of buffer back post 32. As mentioned above spring 40 is engaged on step region 31 of the buffer back post 32 by an interference fit.

The second end of front body 12 is then inserted into bore 14 of back body 12 such that back body 12 is disposed over a portion of front body 28 and surrounds buffer back post 32. When front body 12 is inserted into back body 28, a first end of spring 40 contacts shoulder surface 20 of back body 12. It should be noted that only a limited contact area exists between spring 40 and back body 12 and between spring 40 and buffer back post 32 and that buffer back post 32 is self centering with this approach.

Buffer back post 32 and spring 40 are spaced apart by a predetermined distance. Thus, an air gap spacing exists between buffer back post 32 and spring 40 and buffer back post 32 thus travels freely inside spring 40.

It is important to maintain such an air gap spacing between spring 40 and buffer back post 32 because it is desirable for ferrule 42 to "float." It is thus desirable to have at least a minimum clearance between spring 40 and buffer back post 32 such that connector 10 is free floating. It is desirable to provide a free floating connector to avoid any interference between ferrule 42 and back body 12 and to allow easy alignment of ferrule 42 and an optical fiber. It should also be noted that even in neck down region 18 a maximum gap between internal surface 16 of back body and an external surface of buffer back post 32 should be provided.

When front body 28 is inserted into back body 12 spring 40 compresses between back body shoulder region 20 and front body step region 31. Thus clearance is provided between locking members 24 and 34.

Front body 28 is then engaged with back body 12 by rotating either back body 12 or front body 28 such that a first surface of locking member 34 of front body 28 mates with a first surface of corresponding back body locking member 24. The distance between a second surface of front body locking member on which spring 40 rests and back body shoulder region 20 is selected such that spring 40 is compressed and the front body is secured to the back body by locking members 24 and 34.

It should be noted that when engaging front body locking member 34 and back body locking member 24, front body 28 should be inserted into bore 14 of back body 12 a predetermined distance so that locking members 24 and 34 may be properly oriented. Moreover, the relative positions of back and front body locking members 24, 34 must be appropriately aligned such that when front body 28 is released and compressed spring 40 pushes against front body 28 locking members 24 and 34 mate and spring 40 maintains a force between the back and front body locking members 24, 34.

Here front body locking member 34 is provided as a ring shaped member projecting from outer surface 38 of front body 12 and back body locking member 24 is provided from shoulder region 20 projecting into bore 14 of back body 12. It should be noted however that other locking members or locking arrangements may also be used.

For example, although locking members 24 and 34 are provided as two piece catch assemblies it may be possible to provide them with more than two catches. That is, locking member 34 is here provided as a pair of "wings" extending from base 30a of front body 28. However, two, three, four, five or more catches could also be used. It should be noted of course, that a corresponding number of slots would be required in back body 12 to accept each of the catches.

In the present embodiment, after inserting front body 32 into back body 12, front body 32 is rotated approximately 90 degrees such that locking members 34 engage locking members 24 of back body 12. However, if front body 32 were provided having four locking members and a corresponding number of locking members were provided in back body 12 then front body 32 would it would only be necessary to rotate front body 32 45 degrees to engage the corresponding locking members of the back body.

It may also be advantageous in some applications to provide back body locking member 24 as a continuous ring and to provide front body locking member 34 as a continuous ring having a diameter such that front body locking member 34 could be press fit through the aperture provided by locking member 24.

In yet another embodiment, back body locking member 24 could be provided having a threaded surface. Front body locking member 34 would have corresponding threads such that front body 32 could be threaded through locking member 24. After threading locking member 34 through locking member 24, front body 12 would be free floating inside bore 14 of back body 12.

As will be described in further detail below, after back and front bodies 12, 28 are joined into a single connector assembly 10, an optical fiber may then be disposed through back body 12, front body 28 and ferrule 42.

Figure 2:
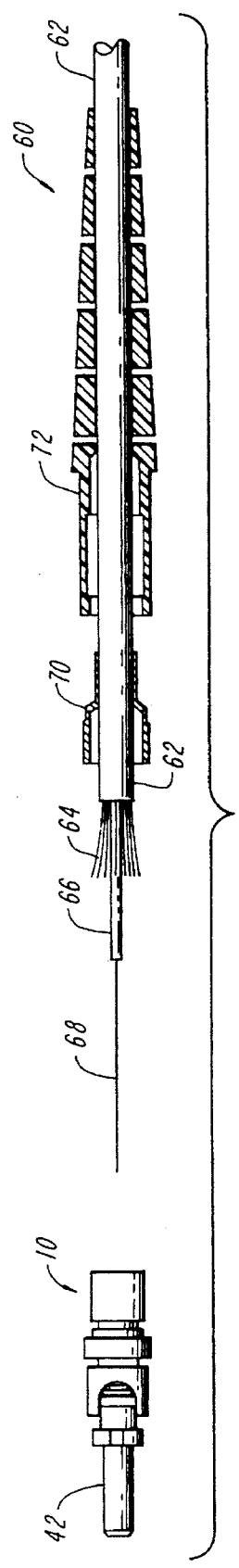
FIGS. 2–4 are a series of views showing the steps in constructing a fiber optic cable assembly.
Figure 3:
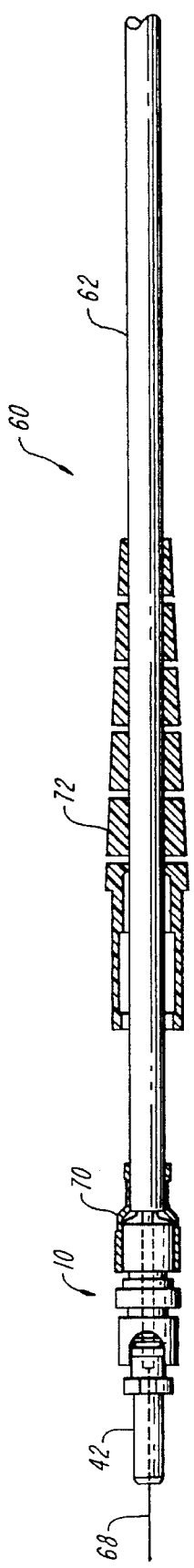
Figure 4:
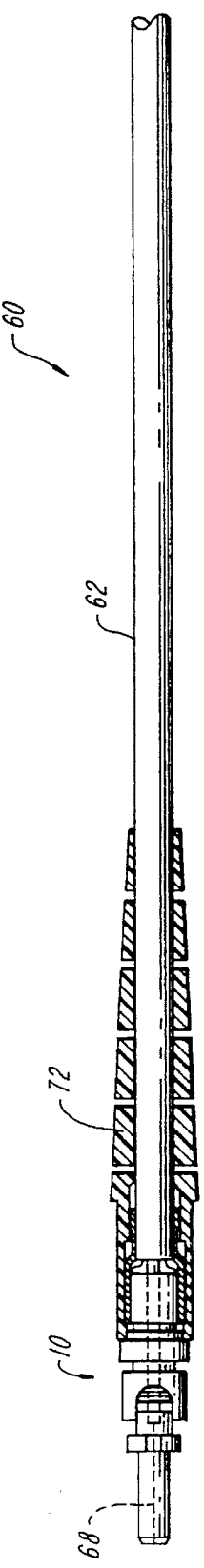

Referring now to FIGS. 2–4 in which like elements of connector assembly 10 are provided having like reference designations, the steps in constructing a fiber optic cable assembly 60 are shown.

A portion of a fiber optic cable 62 is stripped back to expose a shield or a strength member 64 which is typically provided as a wrap of aramid fiber e.g. a Kevlar wrap ("Kevlar" is a trademark of E. I. DuPont deNemours & Co.).

The strength member 64 is exposed and secured to the proximate end of back body 12 by means of a crimp sleeve 70. The outer surface of the proximate end of back body 12 may be provided with a series of knurls or ridges to enhance the gripping action of crimp sleeve 70.

An optical fiber 68, including its cladding and buffer 66, pass through back body 12, into buffer back post 32. Optical fiber 68 passes through buffer back post 32 and terminates in ferrule 42 which is fixedly disposed in cavity 26 of front body 28. It is desirable to allow some relative movement between ferrule 42 and back body 24 for purposes of alignment and stress relief.

Optical fiber 68 is attached to ferrule 42 using epoxy. A syringe is used to inject the epoxy into buffer back post 32. When epoxy is injected into buffer back post 32 there is always a chance that too much epoxy will be applied because the buffer back post bore has a relatively small diameter.

If epoxy overflows, the chance that spring 40 will be glued to buffer back post 32 is minimized because, as described above, an air gap is provided between back post 32 and spring 40. Thus the air gap between buffer back post 32 and spring 40 should be of sufficient size to minimize the chances of buffer back post 32 being glued to spring 40 due to epoxy overflow.

Note that in back body 12 the inside diameter of the crimp region is about 3.0 mm and thus is significantly larger than the outside diameter of buffer back post 32. Thus if epoxy overflow occurs, the excess epoxy will not glue spring 40 to buffer back post 32.

Furthermore, another advantage of the present invention is that the parts float so that connector 10 can be disassembled and any overflowed epoxy can be cleaned up. Thus, during the epoxy injection operation two things may occur. First, the proper amount of epoxy may be injected into buffer back post 32 such that no overflow occurs. If this occurs then optical fiber may be fed through the connector.

Second two much epoxy may be placed in buffer back post 32 so that the epoxy overflows. If the epoxy overflows the excess epoxy can be cleaned up by disassembling connector 10 to allow access epoxy to be removed from buffer back post 32. If back body 12 and spring 40 are not removed from buffer back post 32 the excess epoxy cannot be properly cleaned because the areas of epoxy overflow cannot be accessed. Thus the present invention allows the connector 10 to be disassembled to allow access to those areas which are desirable to clean (i.e. to remove excess epoxy).

In conventional SC connectors the front body which attaches to the ferrule and back body which has crimp are separate. Thus, the spring is not initially compressed is not compressed even after the fiber is terminated.

In conventional SC connectors, the spring only becomes compressed after a frame is disposed over the connecter. The frame holds the front and back bodies together. Before the frame is connected, however, the fiber is already attached via e.g. epoxy to the front body and the Kevlar is attached to the back body. Thus when the two pieces are brought together by the frame there is much stress placed on fiber because the fiber is unable to move. This results in the fiber being bent.

In the present invention spring 40 is compressed before frame 80 (FIG. 5) is attached. Back and front bodies 12, 28 are brought closer together then the prior art approach by about 2 mm (a relatively large distance). When frame 80 (FIG. 5) is attached to connector 10, spring 40 is compressed only slightly more (a relatively small distance typically about one-quarter the desired travel length) such that less stress is placed on the fiber.

Figure 5:
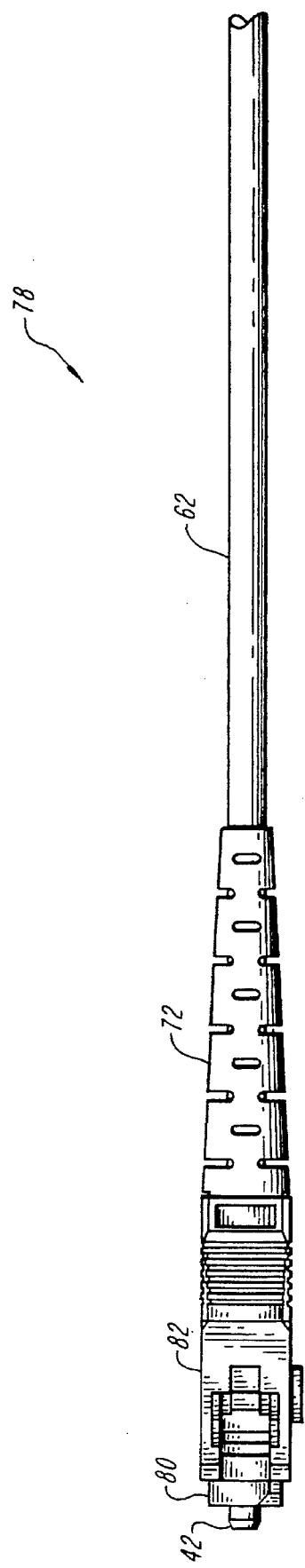
FIG. 5 is a side view of a fiber optic cable assembly.

Referring now to FIG. 5 a frame 80 is disposed over connector 10 and a holder 82 is disposed over frame.

One end of frame 80 (i.e. end from which ferrule protrudes) is provided having chamfered corners. Holder 82 has corresponding chamfers. Thus, to place holder 82 over the frame 80, holder 82 and frame 80 must be properly oriented.

When the holder is placed over the frame a catch maintains the connection between frame 80 and holder 82. Thus the frame and holder can be placed on the connector after the cable is terminated because frame 80 and holder 82 are each put on from the ferrule end rather than the cable end.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A fiber optic connector comprising:
   a back body having a first opening and a second opening and a bore aligned along a longitudinal axis of said back body and extending between the first and second openings, said back body further including:
   a back body locking member disposed on said back body proximate the first end of said back body; and
   a first shoulder region extending into the bore of said back body at a first predetermined distance from the first opening of said back body; and
   a front body having a first end having an aperture therein and a second end disposed in the bore of said back body, said front body further including:
   a back post projecting from the second end of said front body into the bore of said back body; and
   a front body locking member provided as a flange projecting from an outer surface of said front body wherein said front body locking member and said back body locking member engage to secure together said front body and said back body.

2. The connector of claim 1 further comprising a spring having a first end and a second end, said spring disposed about said back post with the first end of said spring disposed against a first surface of said front body and a second end of said spring disposed against a first surface of said back body.

3. The connector of claim 2 wherein:
   said flange is provided having a ring shape; and
   said back body locking member is provided as a second shoulder region projecting into the bore of said back body wherein said first and second shoulder regions of said back body are spaced by a predetermined distance.

4. The connector of claim 3 wherein said back post is provided having a first region with a first diameter and a second region with a second diameter, and wherein the diameter of the first region of said back post is selected to provide an interference fit with the first end of said spring and an outer diameter of the second region of said back post is selected to be less than an inner diameter of said spring.

5. The connector of claim 4 wherein said spring provides a force which maintains a contact region between a first surface of said front body locking member and a first surface of said back body locking member.

6. The connector of claim 5 further comprising a ferrule disposed in the aperture of the first end of said front body.

7. A fiber optic connector comprising:

a back body having a first opening and a second opening and a bore extending between the first and second openings; and a front body having a first end having an aperture therein and a second end, said front body further including a back post projecting from the second end of said front body;

wherein said back body further includes first means for engaging said front body and said front body includes second means for engaging said back body; and a spring disposed against a first one of said first means and said second means, said spring for providing a force which maintains a contact region between said first means and said second means.

8. The connector of claim 7 wherein said spring has a first end and a second end, said spring disposed about said back post with the first end of said spring disposed against a first surface of said front body and a second end of said spring disposed against a first surface of said back body; and means for coupling said spring to said front body and for centering said spring about said back post such that said spring and said back post are substantially concentric.

9. The connector of claim 8 wherein:

said first means is provided as a ring shaped member projecting from an outer surface of said front body; and said second means is provided as a shoulder region projecting into the bore of said back body wherein the shoulder region projecting into the bore of said back body is spaced a predetermined distance from the first opening of said back body and engages the ring shaped member projecting from the outer surface of said front body; and said means for coupling said spring to said front body is provided as a step region on the surface of said front body from which said back post projects, wherein the step region has a diameter selected to provide an interference fit with the first end of said spring and an outside diameter of said back-post is selected to be less than an inside diameter of said spring.

10. A method of terminating a fiber optic cable comprising the steps of:

(a) inserting a ferrule into a first end of a front body with a second opposite end of the front body having a buffer back post projecting therefrom;

(b) sliding a spring over the buffer back post;

(c) engaging the spring to the front body such that the spring is secured over the buffer back post;

(d) coupling a back body to the front body such that the back body surrounds the buffer back post and a first end of the spring contacts a first surface of the back body;

(e) disposing an optical fiber through the ferrule; and (f) securing the optical fiber in the ferrule.

11. The method of claim 10 wherein the spring is engaged on the step region of the back body by an interference fit.

12. The method of claim 11 wherein the step of coupling the back body to the front body further comprises the steps of:

sliding the second end of the front body into a bore of the back body;

compressing the spring between a first surface of the front body and a shoulder region of the back body; and engaging a first locking member of the front body with a corresponding locking member of the back body such that the spring is compressed and the front body is secured to the back body.

13. The method of claim 12 wherein the step of engaging the first locking member of the front body with the locking member of the back body includes the steps of:

inserting the front body into the bore of the back body a predetermined distance;

aligning the relative positions of the first locking member of the front body with the locking member of the back body; and releasing the front body such that the spring maintains a force between the first locking member of the front body and the locking member of the back body.

14. The method of claim 13 wherein the front body locking member is provided as a ring shaped member projecting from an outer surface of the front connector and the back body locking member is provided as a shoulder region projecting into the bore of the back connector and wherein the step of aligning the relative positions of the front body locking member with the corresponding back body locking member comprises the step of:

rotating the front body such that a predetermined region of the ring shaped member is aligned with a predetermined portion of the back body shoulder region.

15. A fiber optic cable assembly comprising:

a fiber optic cable, said fiber optic cable including:
a shield provided from aramid fiber;
a buffer; and
an optical fiber;

a connector coupled to said fiber optic cable, said connector including:
a back body having a first opening and a second opening and a bore extending between the first and second openings of said back body, a locking member disposed on the first end of said back body and a first shoulder region extending into the bore of said back body at a first predetermined distance from the first opening of said back body; and
a front body having a first end and a second end wherein the first end of said front body has an aperture therein, and the second end of said front body has a hollow back-post projecting from a surface thereof and an outer surface of said front body has a locking member projecting therefrom, and wherein the second end of said front body is disposed in the bore of said back body and the front body locking member are engageable to and the back body locking member secure together said front body and said back body; and a ferrule, having a bore therethrough, said ferrule disposed in the aperture of the first end of said front body with said buffer and said optical fiber disposed in the back-post and said optical fiber extending through the bore of said back post and into the bore of said ferrule.

16. The cable assembly of claim 15 further comprising a spring having a first end, a second end and a predetermined length, said spring disposed about said back post with the first end of said spring disposed against a first surface of said front body and a second end of said spring disposed against a first surface of said back body.

17. The cable assembly of claim 16 wherein:

said front body locking member is provided having a ring shape; and said back body locking member is provided as a second shoulder region projecting into the bore of back body wherein the first and second shoulder regions of said back body are spaced by a predetermined distance.

18. The cable assembly of claim 17 wherein said back post is provided having a first region with a first diameter and a second region with a second diameter, and wherein the diameter of the first back post region is selected to provide an interference fit with the first end of said spring and the diameter of the second back post region is selected such that the spring is spaced from the second back post region.

19. The cable assembly of claim 18 wherein the first surface of said front body is spaced from the first surface of said second shoulder region by a distance less than the length of said spring and said spring provides a force which maintains a contact region between a first surface of said front body locking member and a first surface of said back body locking member.

20. The cable assembly of claim 19 further comprising:

a frame disposed about said connector; and a holder disposed about said frame.

21. A fiber optic connector comprising:

a back body having a first opening and a second opening and a bore extending between the first and second openings;

a front body having a first end, a second end, and a pair of shoulder regions, said front body further having a back post projecting from the second end thereof;

a locking member disposed in the bore of said back body for engaging the pair of shoulder region in said front body; and a spring disposed over said back post, said spring for providing a force which maintains a contact region between the shoulder regions of said front body and the locking member disposed in the bore of said back body.

22. The connector of claim 21 wherein said spring has a first end disposed against a first surface of said front body and a second end disposed against a first surface of said back body.

23. A fiber-optic connector comprising:

a back body having a first opening and a second opening and a bore extending between the first and second openings;

a front body having a first end and a second end disposed in the bore of said back body;

a back post projecting from the second end of said front body into the bore of said back body;

a spring disposed about said back post with a first end of said spring disposed against a first surface of said front body and a second end of said spring disposed against a first surface of said back body wherein an outer diameter of said back post is less than an inner diameter of said spring;

a shoulder region formed in an outer surface of said front body; and a locking member projecting into the bore of said back body wherein said locking member is spaced a predetermined distance from the first opening of said back body and engages the shoulder region formed in the outer surface of said front body.

* * * * *